United States Patent
Chen et al.

(10) Patent No.: US 9,923,730 B2
(45) Date of Patent: Mar. 20, 2018

(54) SYSTEM FOR MULTICAST AND REDUCTION COMMUNICATIONS ON A NETWORK-ON-CHIP

(71) Applicant: Intel Corporation, Santa Clara, CA (US)

(72) Inventors: Gregory K. Chen, Portland, OR (US); Mark A. Anders, Hillsboro, OR (US); Himanshu Kaul, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 514 days.

(21) Appl. No.: 14/574,294

(22) Filed: Dec. 17, 2014

(65) Prior Publication Data

US 2016/0182245 A1 Jun. 23, 2016

(51) Int. Cl.
| | |
|---|---|
| *H04L 12/28* | (2006.01) |
| *H04L 12/18* | (2006.01) |
| *H04L 12/761* | (2013.01) |
| *H04L 12/933* | (2013.01) |
| *H04L 12/935* | (2013.01) |

(52) U.S. Cl.
CPC .......... *H04L 12/1886* (2013.01); *H04L 45/16* (2013.01); *H04L 49/109* (2013.01); *H04L 49/3009* (2013.01)

(58) Field of Classification Search
CPC H04L 12/1886; H04L 49/109; H04L 49/3009
See application file for complete search history.

(56) References Cited

U.S. PATENT DOCUMENTS

| 8,284,766 B2 | 10/2012 | Anders et al. |
| 2009/0161659 A1 | 6/2009 | Lee et al. |
| 2011/0116435 A1* | 5/2011 | Liu ...................... H04L 1/1664 370/312 |
| 2014/0226525 A1* | 8/2014 | Eastlake, III ........... H04L 41/12 370/254 |
| 2015/0043575 A1* | 2/2015 | Kumar .................... H04L 45/16 370/390 |
| 2015/0071282 A1 | 3/2015 | Anders et al. |
| 2015/0188829 A1 | 7/2015 | Satpathy et al. |

(Continued)

FOREIGN PATENT DOCUMENTS

| JP | 2012175480 | 9/2012 |
| KR | 1020090031022 | 3/2009 |

(Continued)

OTHER PUBLICATIONS

International Search Report and Written Opinion in International Application No. PCT/US2015/061250 dated Feb. 29, 2016.

(Continued)

*Primary Examiner* — Jutai Kao
(74) *Attorney, Agent, or Firm* — Alliance IP, LLC (57) ABSTRACT

A multicast message that is to originate from a source is received. The multicast message comprises an identifier. A plurality of directions in which the multicast message is to fork at the router are stored. A plurality of messages from the directions in which the multicast message is to fork are received. The received messages are to comprise the identifier. The plurality of messages are aggregated into an aggregate message and sent towards the source.

19 Claims, 7 Drawing Sheets

(56) References Cited

U.S. PATENT DOCUMENTS

| | | | |
|---|---|---|---|
| 2015/0188848 A1* | 7/2015 | Tran | H04L 49/254 370/390 |
| 2015/0220470 A1 | 8/2015 | Chen et al. | |
| 2015/0312953 A1* | 10/2015 | Wang | H04L 1/00 370/312 |

FOREIGN PATENT DOCUMENTS

| WO | 2014209391 A1 | 12/2014 |
|---|---|---|
| WO | WO 2014/209391 | 12/2014 |

OTHER PUBLICATIONS

Sheng Ma et al., "Supporting Efficient Collective Communication in NoCs", High Performance Computer Architecture (HPCA), 2012 IEEE 18th International Symposium on, New Orleans, LA, Feb. 25-29, 2012, pp. 1-12.

Tao Jin et al., "1-to-Many and Many-to-1 Communication in Hybrid Wireless Network-on-Chip", Electronics, Circuits, and Systems (ICECS), 2013 IEEE 20th International Conference on, Abu Dhabi, Dec. 8-11, 2013, pp. 497-500.

Tushar Krishna et al., "Towards the Ideal On-chip Fabric for 1-to-Many and Many-to-1 Communication", Proceedings of the 44th Annual IEEE/ACM International Symposium on Microarchitecture (MICRO), Porto Alegre, Brazil, Dec. 3-7, 2011, pp. 71-82.

Anders, et al., "A 2.9Tb/s 8W 64-Core Circuit-Switched Network-on-Chip in 45 nm CMOS," IEEE, 2008, 978-1-4244-2362-0/08 (pp. 182-185).

Anders et al., "A 4.1Tb/s Bisection-Bandwidth 560Gb/s/W Streaming Circuit-Switched 8×8 Mesh Network-on-Chip in 45nm CMOS," ISSCC 2010, Session 5, Processors, 5.8, Intel Corporation, IEEE International Solid-State Circuits Conference, Feb. 8, 2010, IEEE Digest of Papers, 978-1-4244-6034-2, (pp. 110-112).

Chen et al., "A 340mV-to-0.9V 20.2Tb/s Source-Synchronous Hybrid Packet/Circuit-Switched 16×16 Network-on-chip in 22nm Tri-Gate, CMOS," ISSCC 2014, Session 16/SoC Building Blocks 16.1, Intel Corporation, 2014 IEEE International Solid-State Circuits Conference, Feb. 11, 2014, IEEE Digest of Technical Papers, 978-1-4244-6034-2 (pp. 276-278).

Krishna, et al., "Towards the ideal on-chip fabric for 1-to-many and many-to-1 communication", in MICRO, Dec. 3, 2011; pp. 71-82.

Ma, et al., "Supporting efficient collective communication in NoCs" in Proc of Intl. Symposium on High Performance Computer Architecture; Feb. 29, 2012; pp. 165-177.

Taiwanese Official Letter and Search Report issued for Taiwan (R.O.C.) Patent Application No. 104136335 on Oct. 17, 2016; English translation.

* cited by examiner

|  | 408 | 412 | 416A | 416B | 416C | 416D | 416E |
|---|---|---|---|---|---|---|---|
|  | ID | Address | E | W | N | S | C |
| 404A | 0x91 | 011011 | 1 |  | 1 |  |  |
| 404B | 0x92 | 000110 | 1 |  | 1 | 1 |  |
| 404C | 0x95 | 110101 | 1 |  | 1 |  | 1 |
| 404D | 0xA0 | 101000 |  | 1 | 1 | 1 |  |

SYSTEM FOR MULTICAST AND REDUCTION COMMUNICATIONS ON A NETWORK-ON-CHIP

FIELD

The present disclosure relates in general to the field of computer development, and more specifically, to a system for multicast and reduction communications on a network-on-chip (NoC).

BACKGROUND

Networks-on-Chip (NoCs), for on-die communication between cores, are important in enabling scalable performance as the number of cores and intellectual property (IP) blocks increases in multi-core processors. In such instances, communication between components becomes the key power and performance limiter. NoCs enable efficient sharing of on-chip wiring resources for communication with routers to control and arbitrate the flow of data between communicating components. NoCs transport data across chip between cores or other logic blocks. Various operations of the NoC may result in multicast (one-to-many) messages or reduction (many-to-one) messages. Such messages may increase the network congestion experienced by the NoC.

BRIEF DESCRIPTION OF THE DRAWINGS

Like reference numbers and designations in the various drawings indicate like elements.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™, but may also be used in other devices, such as server computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Figure 1:
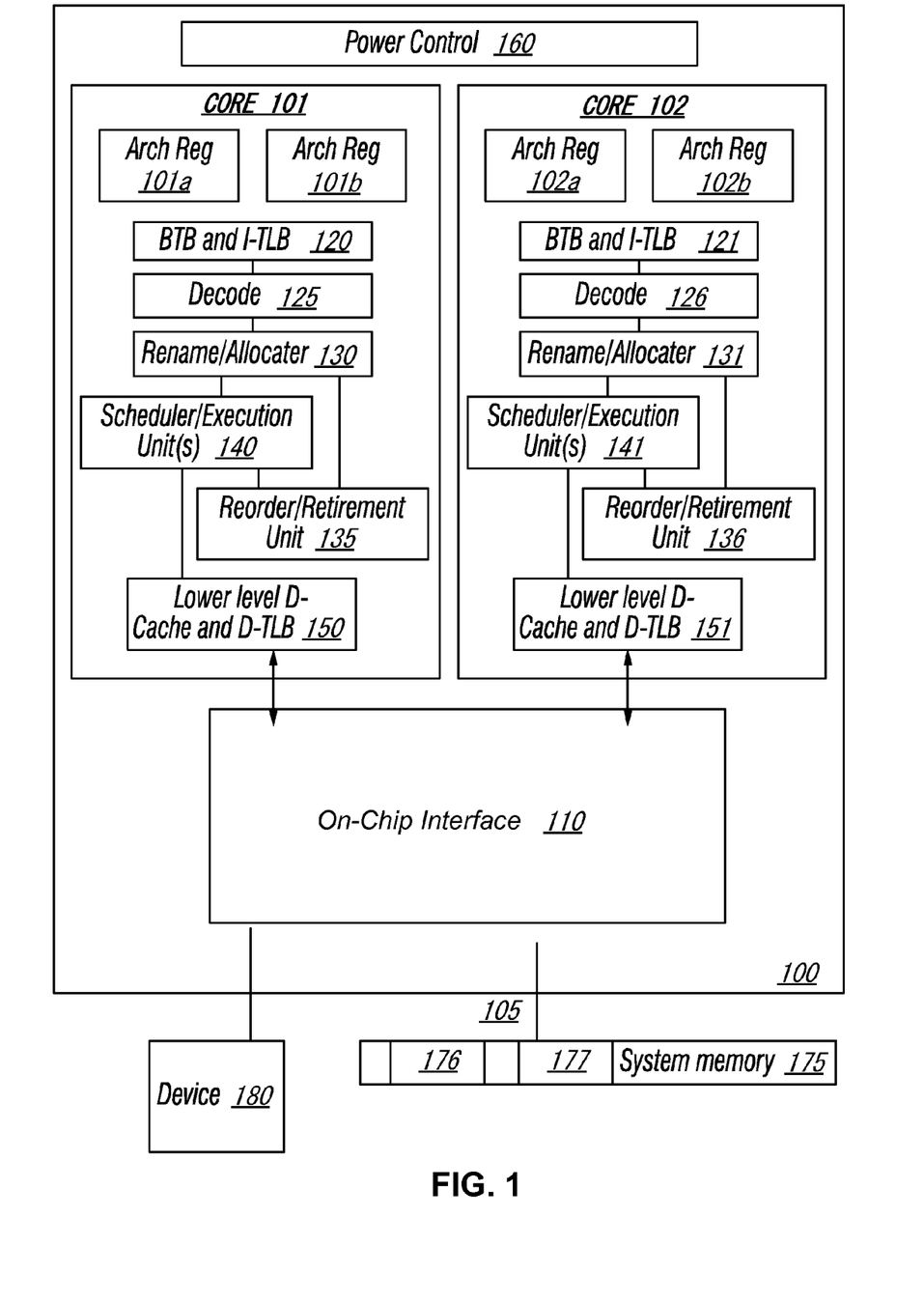
FIG. 1 illustrates a block diagram for an example computing system including a multicore processor in accordance with certain embodiments.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
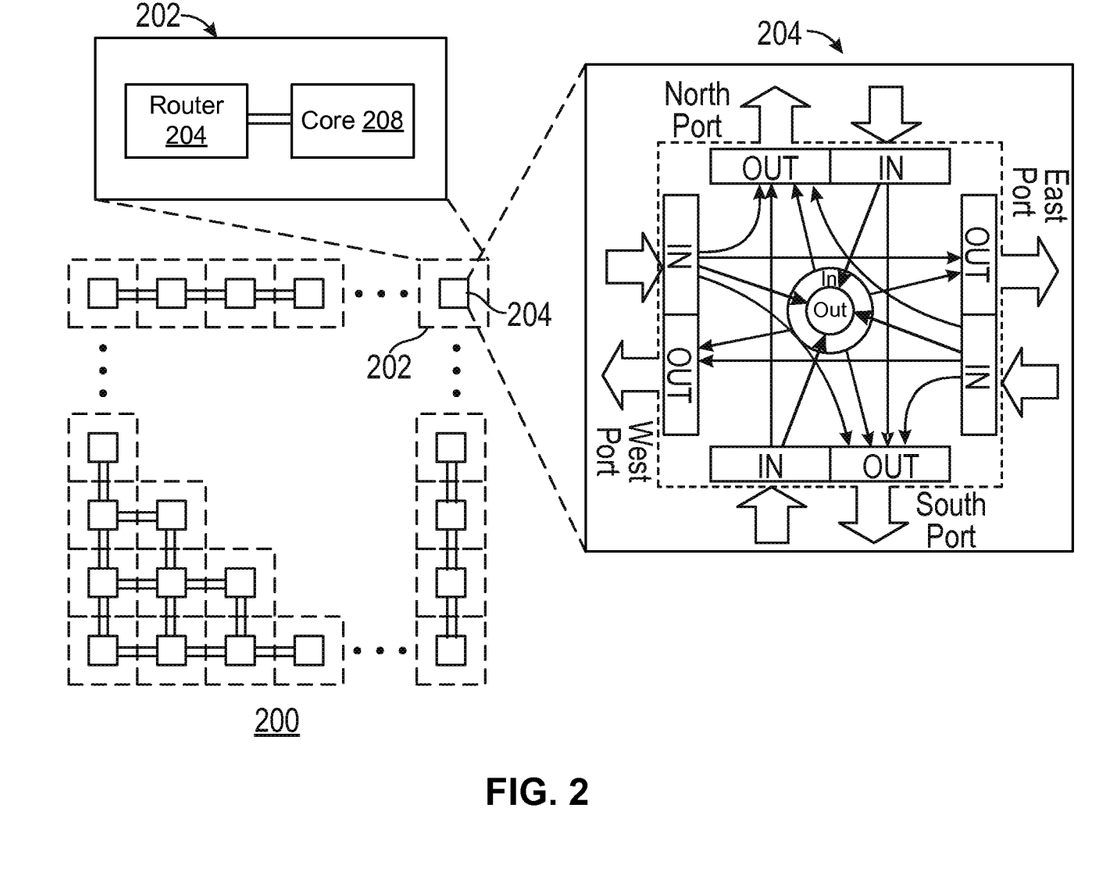
FIG. 2 illustrates a block diagram of a processor comprising a network on a chip (NoC) system including a plurality of routers in accordance with certain embodiments.

FIG. 2 illustrates a block diagram of a processor 200 comprising an NoC system including a plurality of routers 204 in accordance with certain embodiments. The processor 200 may include any processor or processing device, such as a microprocessor, an embedded processor, a digital signal processor (DSP), a network processor, a handheld processor, an application processor, a co-processor, an SoC, or other device to execute code. In particular embodiments, processor 200 is implemented on a single die.

In the embodiment depicted, processor 200 includes a plurality of network elements 202 arranged in a grid network and coupled to each other with bi-directional links. However, an NoC in accordance with various embodiments of the present disclosure may be applied to any suitable network topologies (e.g., a hierarchical network or a ring network), sizes, bus widths, and processes. Each network element 202 includes a router 204. The routers 204 may be communicatively linked with one another in a network, such as a packet-switched network and/or a circuit-switched network, thus enabling communication between components (such as cores, storage elements, or other logic blocks) of the NoC that are connected to the routers. In the embodiment depicted, each router 204 may be communicatively coupled to its own core 208 (or other logic block). As used herein, a reference to a core may also apply to other embodiments where a different logic block is used in place of a core. For example, a logic block may comprise a hardware accelerator (e.g., a graphics accelerator, multimedia accelerator, or video encode/decode accelerator), I/O block, memory controller, or other suitable fixed function logic. The processor 200 may include any number of processing elements that may be symmetric or asymmetric. For example, the cores 208 of processor 200 may include asymmetric cores or symmetric cores. Processor 200 may include logic to operate as either or both of a packet-switched network and a circuit-switched network to provide intra-die communication.

In particular embodiments, packets may be communicated among the various routers 204 using resources of a packet switched network. That is, the packet switched network may provide communication between the routers (and their associated cores). The packets may include a control portion and a data portion. The control portion may include a destination address of the packet, and the data portion may contain the specific data to be communicated on the die 100. For example, the control portion may include a destination address that corresponds to one of the network elements or cores of the die. The packet switched network may include buffering because a dedicated path is not assured from a source to a destination and so a packet may need to be stopped temporarily if two or more packets need to traverse the same link or interconnect. As an example, the packets may be buffered (e.g., by flip flops) at each of the respective routers as the packet travels from a source to a destination. The packets may be received, transmitted and processed by the routers 204. The packet switched network may use point-to-point communication between neighboring routers. The control portions of the packets may be transferred between routers based on a packet clock, such as a 4 GHz clock. The data portion of the packets may be transferred between routers based on a similar clock, such as a 4 GHz clock.

In an embodiment, routers of processor 200 may be variously provided in two networks or communicate in two networks, such as a packet switched network and a circuit-switched network. Such a communication approach may be termed a hybrid packet/circuit-switched network. In such embodiments, packets may be variously communicated among the various routers 204 using resources of the packet switched network and the circuit-switched network. In order to transmit a single data packet, the circuit-switched network may allocate an entire path, whereas the packet switched network may allocate only a single segment (or interconnect). In some embodiments, the packet switched network may be utilized to reserve resources of the circuit-switched network for transmission of data between routers 204.

Router 204 may include a plurality of port sets to variously couple to and communicate with adjoining network elements 202. For example, circuit-switched and/or packet switched signals may be communicated through these port sets. Port sets of router 204 may be logically divided, for example, according to the direction of adjoining network elements and/or the direction of traffic exchanges with such elements. For example, router 204 may include a north port set with input ("IN") and output ("OUT") ports configured to (respectively) receive communications from and send communications to a network element 202 located in a "north" direction with respect to router 204. Additionally or alternatively, router 204 may include similar port sets to interface with network elements located to the south, west, east, or other direction. In the embodiment depicted, router 204 is configured for X-first, Y-second routing wherein data moves first in the east/west direction and then in the north/south direction. In other embodiments, any suitable routing scheme may be used.

In various embodiments, router 204 further comprises another port set comprising an input port and an output port configured to receive and send (respectively) communications from and to another agent of the network. In the embodiment depicted, this port set is shown at the center of router 204. In one embodiment, these ports are for communications with logic that is adjacent to, is in communication with, or is otherwise associated with router 204, such as processor logic of a "local" core 208. Herein, this port set will be referred to as a "core port set," though it may interface with logic other than a core in some implementations. In another embodiment, this port set is for communications with a network element which is in a next level of a network hierarchy higher than that of router 204. In one embodiment, the east and west directional links are on one metal layer, the north and south directional links on a second metal layer, and the core links on a third metal layer. In an embodiment, router 204 includes crossbar switching and arbitration logic to provide the paths of inter-port communication such as that shown in FIG. 2. Logic (such as core 208) in each network element may have a unique clock and/or voltage or may share a clock and/or voltage with one or more other components of the NoC.

Figure 3A:
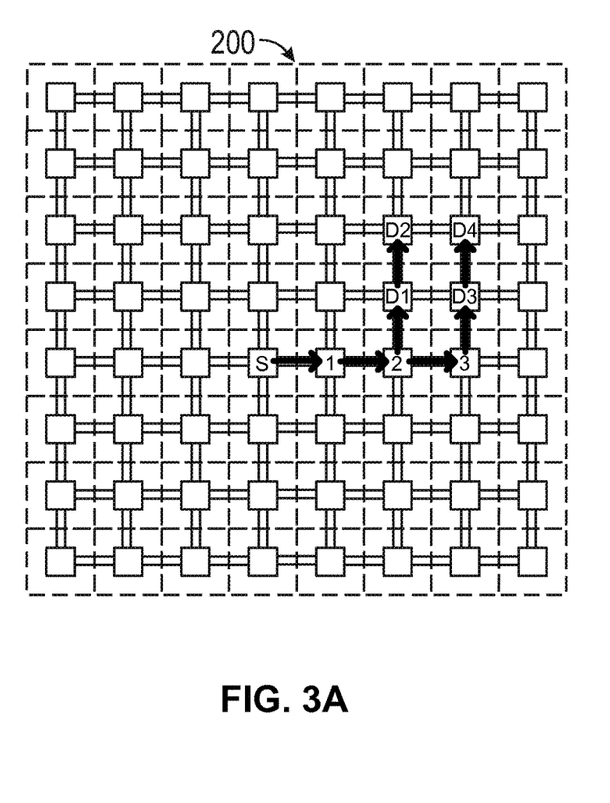
FIG. 3A illustrates an example communication flow of a multicast message in accordance with certain embodiments.
Figure 3B:
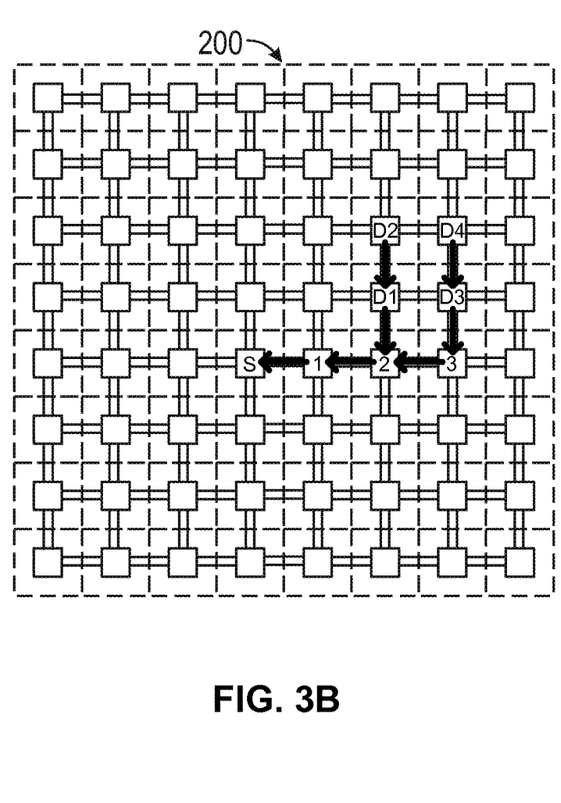
FIG. 3B illustrates an example communication flow of a reduction message in accordance with certain embodiments.

FIG. 3A illustrates an example communication flow of a multicast message in accordance with certain embodiments and FIG. 3B illustrates an example communication flow of a reduction message in accordance with certain embodiments. Multicast (including broadcast messages and one-to-many messages) and reduction messages are examples of collective operations wherein multiple messages originate from the same source (multicast) or are addressed to the same source (reduction). Many systems rely on multiple unicast operations to perform collective messaging, leading to redundant transfers. Such operations may create throughput bottlenecks, limit energy floors, and gate system performance.

Collective operations enhance NoC functionality to increase multi-core processor performance and are critical in cache-coherent systems. Collective operations are commonly performed in pairs between the same set of source and destination cores, such as in cache coherency schemes requiring invalidate/acknowledge and search/update operations. Cache coherency facilitates software coding by making the physical memory space, with multiple copies of data, appear as a unified common resource over all processors. Multi-core processors generally rely on some combination of directory structures and on-die communication to implement coherency. On one end of the spectrum, a processor can keep track of every cached data location in the directory. This allows the processor to achieve coherency with only unicast (one-to-one) operations, but prohibitively increases the latency and area of the directory. On the other end of the spectrum, snooping protocols may be used where all caches see every data transfer, eliminating the need for a directory. However, this approach requires all transfers to be broadcasts, limiting NoC/bus/crossbar throughput and increasing energy consumption, making it an impractical solution in systems with large numbers of processing elements. Many coherency schemes rely on a combination of some data tracking in the directory, accompanied by limited collective functionality in the NoC. In these schemes, the directory sends a multicast message to check for cached copies of data, and an associated reduction operation signals the presence/absence of modified dirty data or acknowledges an invalidation.

Various embodiments of the present disclosure leverage the related nature of multicast and reduction messages (such as those occurring during implementation of a cache coherency scheme) to reduce network congestion by tracking the forking of multicast messages and using this information to streamline messages sent back to the source in response to the multicast messages. In some embodiments, multicast messages fork to reach multiple destinations while adhering to a predefined routing protocol, such as X-first, Y-second routing. At the routers at which the multicast messages are forked, flags indicating the forked directions and a unique ID associated with the multicast message are stored. Reduction messages propagate using a separate network, using a routing protocol that is the reverse of that used to route the multicast messages. For example, if X-first, Y-second routing were used to route the multicast messages, then Y-first, X-second routing would be used so that the reduction messages would retrace the multicast message's path on their way back to the source. As the reduction messages propagate, they clear the information that was recorded during the propagation of the multicast messages. The routers that forked the associated multicast message wait until reduction messages have been received from each branch in the fork and then aggregate the reduction messages before sending the aggregated message back towards the source.

Various embodiments of the present disclosure provide a high throughput solution for reducing redundancy in collective messages, reduce network congestion, and improve energy efficiency. Compared to systems utilizing unicast to send such messages, a broadcast requires 10.6× fewer hops (2720/255) in a 16×16 Mesh NoC, leading to 10.6× lower switching energy and lower NoC congestion to increase throughput by 3× with 1% broadcast transfers. Particular embodiments of the present disclosure provide a scalable hardware implementation of collective operations for various NoC topologies and network sizes.

Referring again to FIG. 3A, a multicast message originates at a network element associated with router S. For example, a core coupled to router S may generate the message. The message may have any suitable format and include any suitable content. As an example, the message may be sent in packet form. Thus, the message may be embodied within one or more packets. The multicast message may include one or more indications of which network elements the message should be delivered to. For example, the multicast message may include the addresses of network elements to which it should be delivered, an indication that the multicast message should be sent to every network element (e.g., when the message is a broadcast message), or some other indication of multiple network elements that that allows the multicast message to be delivered to multiple network elements by router 204. In various embodiments, the multicast message may refer to a location in memory and an operation that should be performed with respect to that memory. In some embodiments, the message is a request that invites a response from the recipients. As an example, the multicast message might be an inquiry as to whether the destination nodes have access to particular data. As another example, the multicast message may be a request to move data from a shared state to an invalid state so that the data may be edited. As yet another example, a memory address may be cached in a shared state in multiple caches. A source that wants to write to the address may send a multicast message to other network elements that may have data associated with the memory address. The source may send an invalidate request message requesting the recipients to mark the specified data as invalid. As yet another example, a memory address may be in an invalid state at a source and the source may want to read or write to the memory address. The source may send an update signal in a multicast message, indicating that the source wishes to access the memory address. In some embodiments, the multicast message includes a unique ID number that allows the routers to identify messages that are sent in response to the multicast message (thus aiding reduction of these messages). This will be explained in more detail below. In some embodiments, a multicast message also includes the address of the source from which it was sent so that response messages may be addressed to this source.

The multicast message is routed through the NoC using any suitable routing protocol. In a particular embodiment, routers 204 use an X-first, Y-second routing protocol to route the multicast message to its proper destinations. Each router along the path of the multicast message examines the address field of the multicast message and determines whether the multicast message should be forked. Forking of the multicast involves sending the message across two different paths. A message may be said to fork if it is sent through multiple output ports of a router (the core output port may be included as one of the ports). Accordingly, the multicast message of FIG. 3A is not forked at router 1, but is forked at router 2 as the message takes one path in the north direction and one path in the east direction. The message is also forked at router D1 as it takes one path in the north direction to router D2 and another path to the core associated with router D1 for delivery. The message is forked at router D3 in a similar manner.

Figure 4:
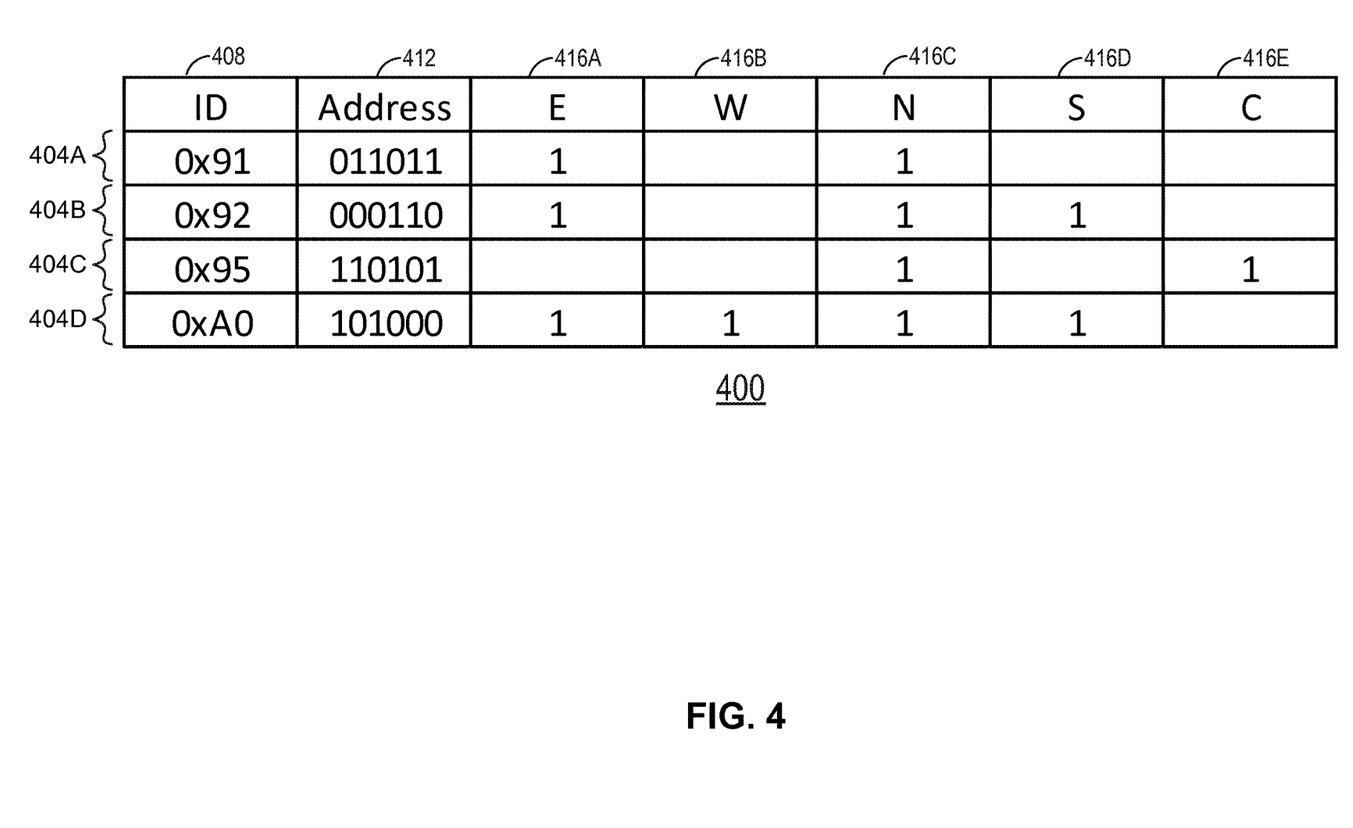
FIG. 4 illustrates an example table that may be used to facilitate multicast and reduction communications in an NoC in accordance with certain embodiments.

FIG. 4 illustrates an example table 400 that may be used to facilitate multicast and reduction communications in an NoC in accordance with certain embodiments. Each router of the NoC may include one or more fork tables 400. In particular embodiments, a router may have a single global fork table 400 that records entries for multicast messages regardless of which port the message entered the router from. In other embodiments, each port may include a fork table that records entries for multicast messages that enter the router through that port. Other embodiments may include any suitable number of fork tables arranged in any suitable manner. Fork table 400 is used to record the directions of the various forks that a multicast message takes at a particular router. Fork table 400 stores a plurality of entries, where each entry is associated with a different multicast message. The fork table 400 may be configured to store any suitable number of entries 404 and may be based on the expected number of concurrent collective operations that will involve the router associated with the fork table. As various examples, the fork table 400 may store 4, 8, or 16 entries. Each entry 404 includes an ID 408 associated with the multicast message. The ID may be any suitable length, such as 8 bits as shown in the example. In various embodiments, fork table 400 is implemented using a content addressable memory (CAM), so that a reduction message can look up an entry of the fork table based on the unique ID associated with the reduction message. In some embodiments, each entry 404 also includes the address 412 of the source of the multicast message. In such embodiments, the address 412 may be used in conjunction with the ID 408 to further distinguish between multicast messages (i.e., to prevent aliasing between IDs from different cores). Each entry 404 also includes fields to store an indication (e.g., a bit) representing whether the associated multicast message was forked in particular directions. In the embodiment depicted, bits may indicate whether the multicast message was forked in an east direction (E), west direction (W), north (N) direction, a south (S) direction, or to the core (C). These bits may be referred to as direction flags. In the embodiment depicted, every direction may have a field and thus the fork table 400 may function as a global fork table for a router. In embodiments where a fork table is placed in or proximate each port, the fork table may omit the direction of the port. For example, a fork table at the north port of a router may include direction flags for the east, west, south, and core directions. As another example, a fork table at the core port of a router may include direction flags for the east, west, south, and north directions.

When a multicast message that needs to be forked arrives at a router and the associated fork table is full, the router may either revert to sending unicast messages or it may block the multicast message and wait for storage space in the fork table 400 to clear.

Referring to FIG. 3B, reduction messages originate at network elements associated with routers D1, D2, D3, and D4 and are sent to router S. For example, cores coupled to routers D1, D2, D3, and D4 may each generate a reduction message. A reduction message may be a message that is sent in conjunction with other messages to the same destination. The message may have any suitable format and include any suitable content. As an example, the message may be sent in packet form. Thus, the message may be embodied within one or more packets. The reduction message may include one or more indications of one or more network elements the message should be delivered to (while generally a reduction message is addressed to a single network element, there may be instances where it may be addressed to multiple network elements). For example, the multicast message may include the address or addresses of network elements to which it should be delivered or other suitable indication allowing it to be delivered to the appropriate destination by routers 204. In some embodiments, a reduction message is sent in response to a request received by the source of the reduction message. As an example, a network element may receive a message inquiring as to whether a core of the network element has access to particular data and the core may send a reduction message indicating whether or not it has access to the data. As another example, a network element may receive a request to move data from a shared state to an invalid state so that the data may be edited and may respond with a reduction message indicating that the data has been moved to the invalid state. In yet another example, a memory address may be cached in a shared state in multiple caches. A source that wants to write to the address may send a multicast message to other network elements that may have the memory address in their cache. The source may send an invalidate request message requesting the recipients to mark the specified data as invalid. The destinations may respond with a reduction message acknowledging that the data has been marked as invalid (or that the destination doesn't have the address). As yet another example, a memory address may be in an invalid state at a source and the source may want to read or write to the memory address. The source may send an update signal in a multicast message, indicating that the source wishes to access the memory address. If the memory address is shared or invalid in a cache of the destination, the destination may respond with an invalidation/acknowledge reduction message. If the memory address is modified in a cache of the destination, the destination may respond with a reduction message that includes the modified data. During this step, main memory may also be updated with modified dirty data. In particular embodiments, if the core of the network element has already modified the data, the reduction message may also include an indication that the data was previously modified. In some embodiments, the reduction message includes a unique ID number that corresponds to the ID number of an associated multicast message. In various embodiments, a reduction message also includes the address of the source from which it was sent.

A reduction message may propagate to its destination following the reverse path of a multicast message it is associated with. Accordingly, if X-first, Y-second routing was used to deliver the multicast message, then Y-first, X-second routing will be used to deliver the reduction message. The reduction messages may use a network that is separate but closely coupled to the network used to route the multicast messages in order to eliminate protocol deadlock between message classes. Each router that receives a reduction message checks its fork table to determine whether an entry 404 exists for the ID 408 included in the reduction message (as mentioned earlier, the address 412 may optionally be used along with the ID to differentiate between unique message groups). If the router includes a global fork table, the global fork table is checked. If the router includes a fork table at each port, the fork table associated with the output port of the router may be checked since this is where the entry resulting from an associated multicast message will have been created. If there is no entry for the ID, then it is determined that no forking took place at that router for the associated multicast message, and the reduction message is forwarded to the next router. If there is an entry 404 with the same ID, then the appropriate direction flag 416 is cleared. As an example, if a reduction message having an ID of 0x91 was received at a router with the fork table illustrated in FIG. 4 from a router to the north of the router, the N bit for entry 404A would be cleared. The reduction message is stored until all of the direction flags in the associated entry 404 have been cleared (indicating that all of the related reduction messages have been received). As an example, if a reduction message having an ID of 0x92 is received from a router to the north, the reduction message will be stored until reduction messages having an ID of 0x92 are received from the router to the east and the router to the south. When all direction flags for an entry 404 have been cleared, the entry is cleared from the fork table and the reduction messages associated with the ID of the entry are aggregated and forwarded to the next router on the path back to the addressee of the reduction messages (e.g., the source of the original multicast message). Each router or a subset of routers may include aggregation logic to aggregate the reduction messages. Aggregation may be performed in any suitable manner. As an example, the reduction messages may each be placed in a larger message without any editing of the messages. As another example, the content of the reduction messages may be aggregated to produce a new aggregated message (which may result in an aggregated message that is smaller than an aggregated message that simply includes copies of each reduction message). As mentioned earlier, the aggregation of the reduction messages may reduce network traffic and reduce or eliminate redundant messages.

In various embodiments, a reduction message (or multiple reduction messages) may be forwarded by a router without being aggregated even though a fork table may associate that reduction message with one or more other reduction messages that have not yet arrived at the router. The remaining messages may or may not be aggregated and forwarded depending on the particular embodiment. In some embodiments, whether the remaining messages are forwarded may be dependent on a message type of the reduction messages.

As one example, a multicast message may be sent to a group of destination cores in order to poll for modified data, but only one core may have the modified data. When a reduction message from this core (indicating that a cache coupled to the core has the modified data) arrives at a router at which the associated multicast message was forked, the reduction message may be forwarded to the source core immediately, without waiting for the other reduction messages. In various embodiments, when all the other associated reduction messages arrive, an aggregated message may be sent to the source core indicating that all reduction message transfers associated with the multicast message are complete. In another embodiment, the other reduction messages may be discarded by the router.

Referring again to FIG. 3B, a reduction message from a core coupled to router D2 is sent to router D1, where it is aggregated with a reduction message from a core coupled to router D1. This aggregated message is sent to router 2, where it is stored pending receipt of a reduction message from router 3. At any suitable time, a reduction message from a core coupled to router D4 is also sent to router D3, where it is aggregated with a reduction message from a core coupled to router D3. This aggregated message is sent to router 3 where it is forwarded to router 2. Upon arrival at router 2, the aggregated message received by router 2 from router 3 is aggregated with the aggregated message received by router 2 from router D1. This aggregated message is then forwarded back to the source via routers 1 and S.

In particular embodiments, aggregation of reduction messages may be achieved even though the reduction messages are not associated with a multicast message. In such embodiments, one or more of the reduction messages may include indications of additional reduction messages that will be sent with the same ID so that routers that are to receive multiple reduction messages may know to wait for the additional message(s) such that the messages may be aggregated before forwarding to the next router. In alternative embodiments, the information about the routing of the reduction messages may be sent in a communication that is separate from the reduction messages. For example, a relatively small sized communication that indicates the ID of the future reduction messages and information about the paths that the reduction messages will take is sent ahead of the actual reduction messages. The routers may extract information from these communications, store this information in a fork table 400, and use such information to aggregate the reduction messages in a manner similar to that described above.

Figure 5:
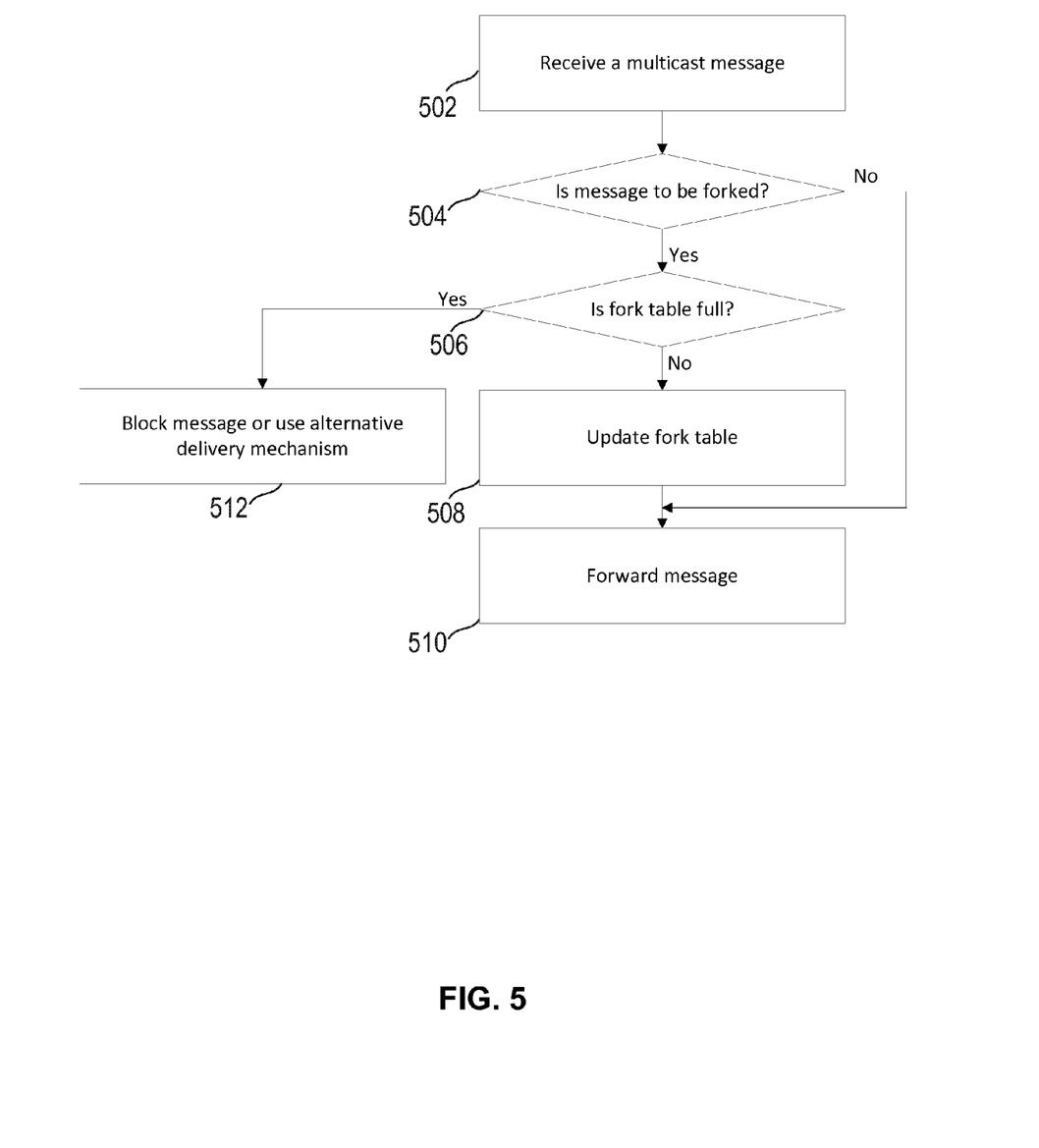
FIG. 5 illustrates an example method for handling a multicast message in accordance with certain embodiments.

FIG. 5 illustrates an example method for handling a multicast message in accordance with certain embodiments. At step 502, a multicast message is received (e.g., at a router 204). At step 504, a determination as to whether the message is to be forked is made. If the message is not to be forked, then the message is forwarded at step 510. For example, the message may be forwarded to the next router on the way to its destination or, if the message has arrived at its destination, it may be forwarded to a core associated with the router. If the message is to be forked, a determination as to whether the appropriate fork table is full. If the fork table is full, the message may be blocked or an alternative delivery mechanism (e.g., unicast messaging) may be used at step 512. If the fork table is not full, the fork table is updated with an entry corresponding to the multicast message. For example, an ID included in (or otherwise associated with) the message may be stored in the fork table along with an indication of which directions the message is to be forked to. The multicast message is then forwarded along the forked paths at step 510. In particular embodiments, the steps of the method of FIG. 5 may be performed by each router along the path from the source of the multicast message to each destination of the multicast message).

Some of the steps illustrated in FIG. 5 may be combined, modified or deleted where appropriate, and additional steps may also be added to the flowchart. Additionally, steps may be performed in any suitable order without departing from the scope of particular embodiments.

Figure 6:
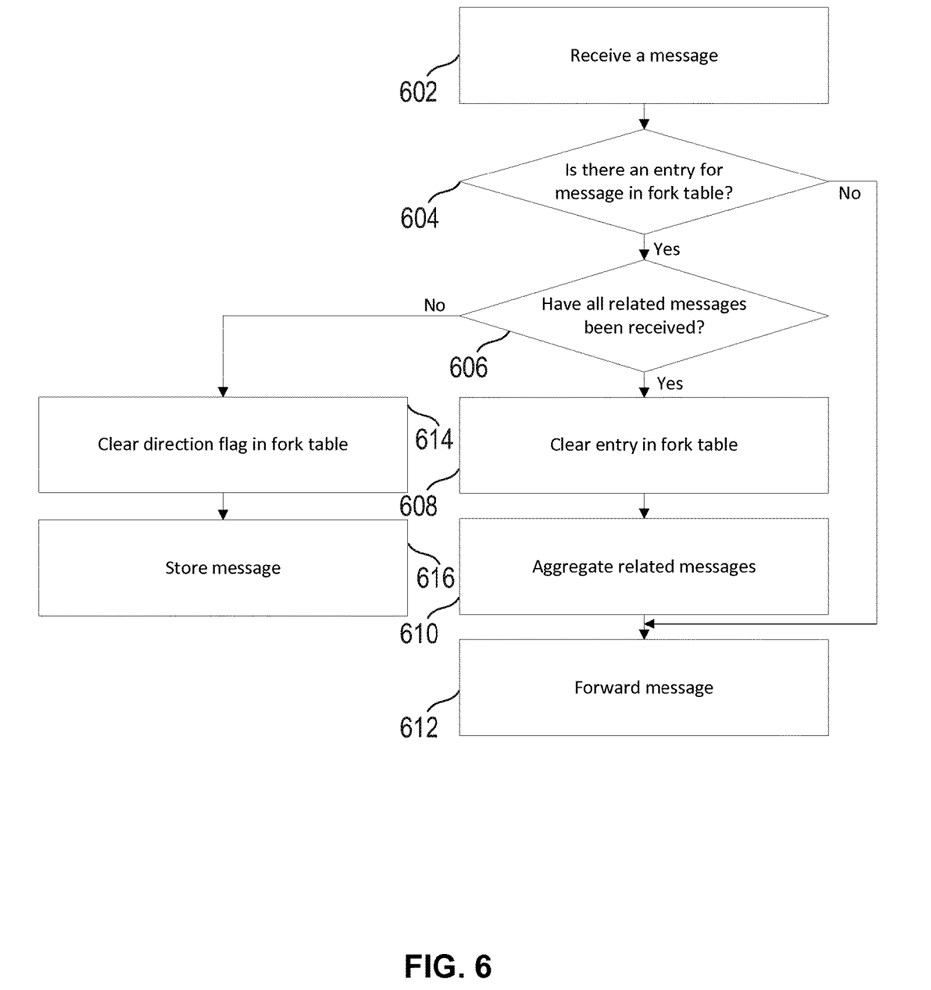
FIG. 6 illustrates an example method for handling a reduction message in accordance with certain embodiments.

FIG. 6 illustrates an example method for handling a reduction message in accordance with certain embodiments. At step 602, a message is received (e.g., at a router 204). At step 604, it is determined whether an entry associated with the message is stored in a fork table. For example, if a message does not include an ID 408, it may be determined that there is no entry 404 for the message in the fork table 400, so the message is forwarded normally at step 612. As another example, an ID 408 of the message may be identified but it may be determined that a fork table 400 does not have any entries with that ID. Accordingly, the message is forwarded at step 612. If the message does have an ID and is associated with an entry 404 in the fork table 400, it is determined whether all related messages have been received at step 606. For example, a fork table 400 may be checked using the ID 408 to determine if any direction flags (other than the direction flag associated with the direction the message came from) are set. If it is determined that all related messages have not been received, the direction flag associated with the direction the message came from is cleared at step 614 and the message is stored at 616 until all related messages have been received. In alternative embodiments, a message may immediately be forwarded without being stored if special conditions are met (e.g., if the reduction message is a response indicating that modified data is associated with a particular core as described above). Upon a determination that all related messages have been received at step 606, the entry associated with the ID 408 of the message is cleared at step 608 and all stored messages that are associated with that ID are aggregated at step 610. The aggregated message is then forwarded at step 612.

Some of the steps illustrated in FIG. 6 may be combined, modified or deleted where appropriate, and additional steps may also be added to the flowchart. Additionally, steps may be performed in any suitable order without departing from the scope of particular embodiments.

In particular embodiments, a reduction message processed according to the steps of the method of FIG. 6 is sent in response to a multicast message process according to the steps of the method of FIG. 5. In various embodiments, the steps of the method of FIG. 6 may be performed by each router in the path between the source of the multicast message and each destination of the multicast message. The reduction messages may be routed in a network that is separate from but closely coupled to the network that routes the multicast message. For example, each router may have components that are configured to handle multicast messages and separate components that are configured to handle reduction messages.

Figure 7:
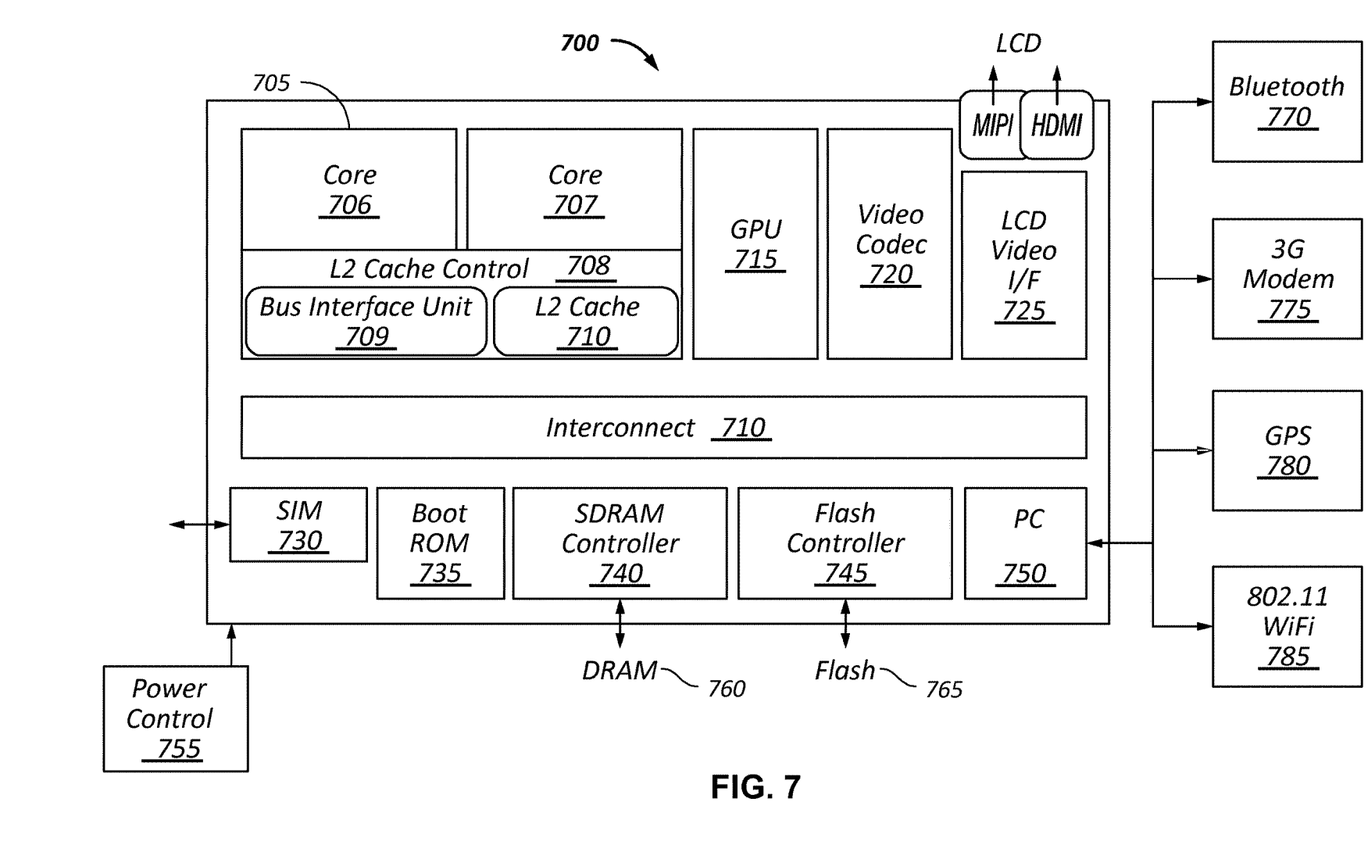
FIG. 7 illustrates another block diagram for an example computing system in accordance with certain embodiments.

FIG. 7 illustrates another embodiment of a block diagram for an example computing system in accordance with one embodiment. In this figure, an embodiment of a system on-chip (SOC) design in accordance with the disclosures is depicted. As a specific illustrative example, SOC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 700 includes 2 cores—706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an sARM-based processor design, or a customer thereof, as well as their licensees or adopters. Cores 706 and 707 are coupled to cache control 708 that is associated with bus interface unit 709 and L2 cache 710 to communicate with other parts of system 700. Interconnect 710 includes an on-chip interconnect, such as an IOSF, AMBA, or other interconnect discussed above, which potentially implements one or more aspects of the described disclosure.

Interface 710 provides communication channels to the other components, such as a Subscriber Identity Module (SIM) 730 to interface with a SIM card, a boot rom 735 to hold boot code for execution by cores 706 and 707 to initialize and boot SOC 700, a SDRAM controller 740 to interface with external memory (e.g. DRAM 760), a flash controller 745 to interface with non-volatile memory (e.g. Flash 765), a peripheral control Q1650 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the disclosure described herein.

In addition, the system illustrates peripherals for communication, such as a Bluetooth module 770, 3G modem 775, GPS 785, and WiFi 785. Note as stated above, a UE includes a radio for communication. As a result, these peripheral communication modules are not all required. However, in a UE some form a radio for external communication is to be included.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

One or more embodiments may provide an apparatus, a system, a machine readable storage, a machine readable medium, hardware- and/or software-based logic (e.g., a router), a method, and a non-transitory machine readable medium including information to represent structures, when manufactured, to be configured to receive a multicast message that is to originate from a source, the multicast message to comprise an identifier, store a plurality of directions in which the multicast message is to fork at the router, receive a plurality of messages from the directions in which the multicast message is to fork, the received messages to comprise the identifier, aggregate the plurality of messages into an aggregate message, and send the aggregate message towards the source.

In at least one example, the apparatus is a processor.

In at least one example, the multicast message is to further comprise an address of the source.

In at least one example, the messages received from the directions the multicast message is to fork are responses to a request of the multicast message.

In at least one example, the multicast message is a request associated with cache memory to be stored by the processor and the plurality of messages are responses to the request.

In at least one example, the router is further to clear the plurality of directions in which the multicast message is to fork.

In at least one example, the router is further to associate the plurality of directions in which the multicast message is to fork with the identifier in a fork table of the router.

In at least one example, the router comprises a fork table for a port set of a plurality of port sets of the router.

In at least one example, a direction in which the multicast message is to fork is towards a core associated with the router.

In at least one example, a direction in which the multicast message is to fork is towards another router of the processor.

One or more embodiments may provide an apparatus, a system, a machine readable storage, a machine readable medium, hardware- and/or software-based logic (e.g., a router), a method, and a non-transitory machine readable medium including information to represent structures, when manufactured, to be configured to receive (e.g., by a fork table) an identifier and associate the identifier with a plurality of indications, an indication to identify a direction from which a message including the identifier is to be received; receive (e.g., by a plurality of input ports) a plurality of messages from the directions identified by the plurality of indications, wherein a message of the plurality of messages is to comprise the identifier; and to aggregate (e.g., by aggregation logic) the plurality of messages into an aggregate message.

In at least one example, the identifier is received in a multicast message that is to be sent in the directions identified by the plurality of indications.

In at least one example, the plurality of indications are to be determined by the apparatus based on an address of the router and a plurality of destinations of the multicast message.

In at least one example, the fork table is further to associate the identifier and the plurality of indications together in an entry of the fork table.

In at least one example, the fork table is further to clear an indication associated with a direction when a message comprising the identifier is received from the direction.

In at least one example, the fork table is further to delete the entry of the fork table after receiving the plurality of messages.

In at least one example, the identifier is received in a multicast message that is to be sent in the directions identified by the plurality of indications.

In at least one example, the plurality of indications are to be determined based on an address of a router receiving the identifier and a plurality of destinations of the multicast message.

In at least one example, the identifier and the plurality of indications are to be associated together in an entry of a fork table.

One or more embodiments may provide an apparatus, a system, a machine readable storage, a machine readable medium, hardware- and/or software-based logic (e.g., a router), a method, and a non-transitory machine readable medium including information to represent structures, when manufactured, to be configured to comprise a plurality of routers implementing a network on a chip. A router is to be associated with a core and is to receive a multicast message that is to originate from a source, the multicast message to comprise an identifier; store a plurality of directions in which the multicast message is to fork at the router; receive a plurality of messages from the directions in which the multicast message is to fork, the plurality of messages to comprise the identifier; aggregate the plurality of messages into an aggregate message; and send the aggregate message towards the source.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
    a router to:
        receive a multicast message that is to originate from a source, the multicast message to comprise an identifier;
        in response to the multicast message, set a plurality of direction flags corresponding to a plurality of directions in which the multicast message is to fork at the router;
        receive a plurality of messages from the plurality of directions, the received messages to comprise the identifier;
        in response to receiving the plurality of messages from the plurality of directions, clear the plurality of direction flags;
        aggregate the plurality of messages into an aggregate message; and
        send the aggregate message towards the source.

2. The processor of claim 1, wherein the multicast message is to further comprise an address of the source.

3. The processor of claim 1, wherein the messages received from the plurality of directions are responses to a request of the multicast message.

4. The processor of claim 1, wherein the multicast message is a request associated with cache memory to be stored by the processor and the plurality of messages are responses to the request.

5. The processor of claim 1, wherein the router is further to associate the plurality of directions in which the multicast message is to fork with the identifier in a fork table of the router.

6. The processor of claim 1, wherein the router comprises a fork table for a port set of a plurality of port sets of the router.

7. The processor of claim 1, wherein a direction in which the multicast message is to fork is towards a core associated with the router.

8. The processor of claim 1, wherein a direction in which the multicast message is to fork is towards another router of the processor.

9. An apparatus comprising:
    a fork table to receive an identifier of a multicast message and associate the identifier with a plurality of indications by setting a plurality of direction flags, an indication to identify a direction from which a message including the identifier is to be received;
    a plurality of input ports to receive a plurality of messages from the directions identified by the plurality of indications, a message of the plurality of messages to comprise the identifier; and
    an output port to send an aggregate message comprising an aggregation of the plurality of messages;
    wherein the fork table is further to clear the plurality of direction flags in response to the input ports receiving the plurality of messages from the directions identified by the plurality of indications.

10. The apparatus of claim 9, wherein the identifier is received in a multicast message that is to be sent in the directions identified by the plurality of indications.

11. The apparatus of claim 9, wherein the plurality of indications are to be determined by the apparatus based on an address of a router and a plurality of destinations of the multicast message.

12. The apparatus of claim 9, wherein the fork table is further to associate the identifier and the plurality of indications together in an entry of the fork table.

13. The apparatus of claim 12, wherein the fork table is further to clear an indication associated with a direction when a message comprising the identifier is received from the direction.

14. The apparatus of claim 12, wherein the fork table is further to delete the entry of the fork table after receiving the plurality of messages.

15. A non-transitory machine readable medium including information to represent structures, when manufactured, to be configured to:
receive an identifier of a multicast message and associate the identifier with a plurality of indications by setting a plurality of direction flags, an indication to identify a direction from which a message including the identifier is to be received;
receive a plurality of messages from the directions identified by the plurality of indications, the plurality of messages to comprise the identifier;
clear the plurality of direction flags in response to receiving the plurality of messages from the directions identified by the plurality of indications; and
aggregate the plurality of messages into an aggregate message.

16. The medium of claim 15, the structures, when manufactured, to be further configured to receive the identifier in a multicast message that is to be sent in the directions identified by the plurality of indications.

17. The medium of claim 16, the structures, when manufactured, to be further configured to determine the plurality of indications based on an address of a router receiving the identifier and a plurality of destinations of the multicast message.

18. The medium of claim 15, the structures, when manufactured, to be further configured to associate the identifier and the plurality of indications together in an entry of a fork table.

19. A system to comprise:
a plurality of routers implementing a network on a chip, a router to be associated with a core, a router to:
receive a multicast message that is to originate from a source, the multicast message to comprise an identifier;
in response to the multicast message, set a plurality of direction flags corresponding to a plurality of directions in which the multicast message is to fork at the router;
receive a plurality of messages from the plurality of directions, the plurality of messages to comprise the identifier;
in response to receiving the plurality of messages from the plurality of directions, clear the plurality of direction flags;
aggregate the plurality of messages into an aggregate message; and
send the aggregate message towards the source.

* * * * *